P. W. King,
Cage Trap.
No. 77,622.          Patented May 5, 1868.

LONGITUDINAL SECTION IN THE LINE A-B ON PLAN.

Perspective View.

PLAN.

WITNESSES:    John J. Knox       INVENTOR.
Farnam J. Bowen                       P. W. King

United States Patent Office.

P. W. KING, OF LOWVILLE, NEW YORK.

Letters Patent No. 77,622, dated May 5, 1868.

IMPROVED ANIMAL-TRAP.

The Schedule referred to in these Letters Patent and making part of the same.

Be it known that I, P. W. KING, of Lowville, in the county of Lewis, and State of New York, have invented a new and improved Self-Setting Animal-Trap; and I do hereby declare that the following is a full and exact description thereof, reference being had to the accompanying drawings, and the explanatory letters thereon, forming a part of this specification, in which—

Figure 3:
Figure 1:
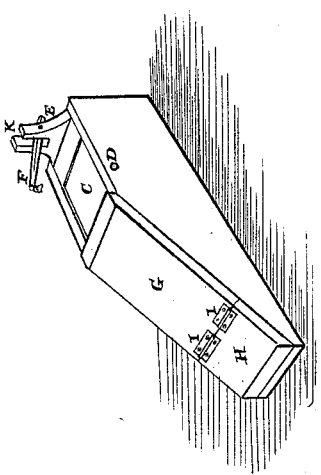
Figure 2:

Figure 1 is a perspective view,
Figure 2 a plan, and
Figure 3 a longitudinal section on the line A B on plan.
In each of the drawings—
C is the platform.
D, the axis on which the platform turns.
E, a rigid bent wire, from the short end of the lever F to the spring-catch J.
F, the lever projecting over the platform C.
G, the inclined plane leading to platform C.
H, part of incline G, forming the door H.
I I, hinges of the door H.
J, the spring-catch, of iron.
K, stanchions, formed on the end of the box, to which the lever F is pinned.
L, a partition, with a slot at the top, through which the catch-spring protrudes.

The top consists of a tilting-platform, mounted on an axis, with a suitable counterpoise at one end. This counterpoise always brings the platform to a horizontal position, when the platform is unloaded. When it gets to the horizontal position it is secured so by a spring-catch underneath. It will, with the spring-catch thus securing it, sustain a reasonable load, as, for example, an animal. Extending above the platform is a lever, movable on a pin as a fulcrum. On the short end of the lever is a rigid bent wire, and also attached to the spring-catch, forming a connection similar to a bell-crank.

On the long end of the lever which projects over the horizontal platform is secured the bait. There is a door, with a suitable fastener, forming the lower end of the inclined plane, through which door the animals are driven out.

To enable others the better to make use of my invention, I will proceed to describe its operation.

Having constructed my box of wood or sheet iron, of the form intimated in the drawings, as well as the several parts which, in combination, comprise a self-acting animal-trap, then the animal is allured by the bait on the end of the lever F, its ascent thereto being facilitated by the inclined plane G, and it (the animal) is thus brought on the platform C.

The small power acting in depressing the lever at F, where the bait is well secured, when the animal pulls at the bait, immediately raises the short end of the lever, and with it rises the rigid bent wire E, and thus draws back the spring-catch J. The weight of the animal overcoming the counterpoise of the platform, it (the platform) tilts down, and precipitates the animal into the interior of the trap. When the animal is clear off the platform, the counterpoise on its short end brings it to its horizontal position instantly, as the recoil, so to speak, is sufficient to overcome the elasticity of the spring-catch J, moving up along it with very little friction.

Thus the trap is again set, and the number of animals that can be caught only being limited by the interior capacity of the trap.

The only precaution that is necessary being to secure the bait firmly in the first instance.

What I claim as my invention, and desire to secure by Letters Patent, is—

The combination of the members C, E, F, G, H, and J, for the purposes intended.

Lowville, Lewis county, New York, November 25, 1867.

P. W. KING.

Witnesses:
    JOHN J. KNOX,
    FARNUM J. BROWN.